United States Patent

[11] 3,620,540

[72] Inventors Ernest T. Jagger
Newcastle Upon Tyne;
Geoffrey W. Halliday, Northumberland;
Frank Harrison, Sunderland, all of England
[21] Appl. No. 24,208
[22] Filed Mar. 31, 1970
[45] Patented Nov. 16, 1971
[73] Assignee George Angus & Company Limited
Newcastle upon Tyne, England
[32] Priority May 9, 1969
[33] Great Britain
[31] 23,697/69

[54] SHAFT SEALS
5 Claims, 6 Drawing Figs.
[52] U.S. Cl. .................................................... 277/134
[51] Int. Cl. .................................................... F16j 15/32

[50] Field of Search ......................................... 277/134, 67, 96

[56] References Cited
UNITED STATES PATENTS
3,504,918 4/1970 Halliday ........................ 277/134
3,534,969 10/1970 Weinand ....................... 277/134 X Primary Examiner—Samuel B. Rothberg
Attorney—Larson, Taylor & Hinds ABSTRACT: A lip-type shaft seal with a sealing band between opposite frustoconical surfaces has two or more arcuate ridges, or sets of ridges, molded on the outer frustoconical surface so that they mutually intersect and their ends intercept the sealing band to provide two or more pairs of feedback vanes surfaces effective for either direction of relative shaft rotation.

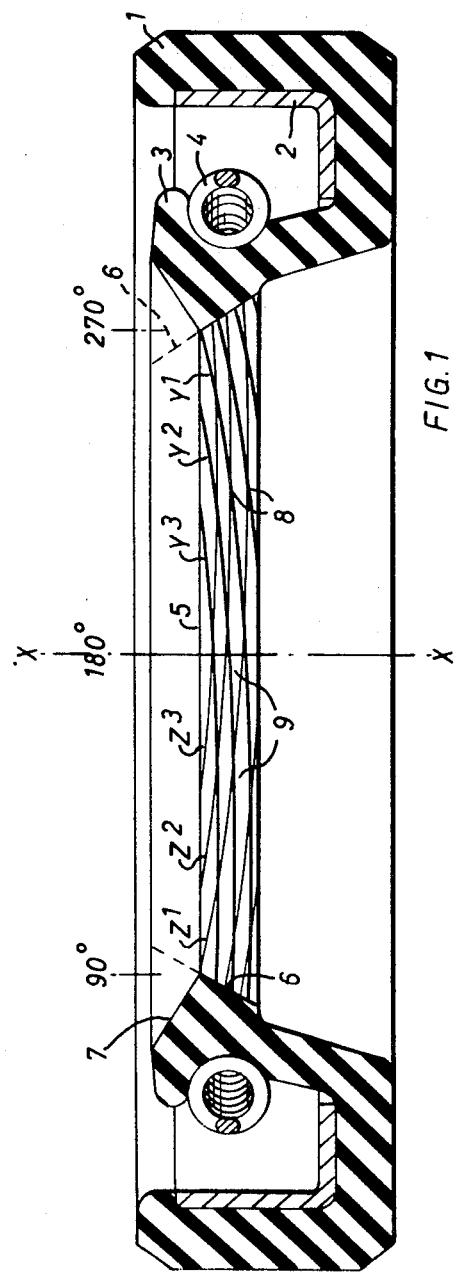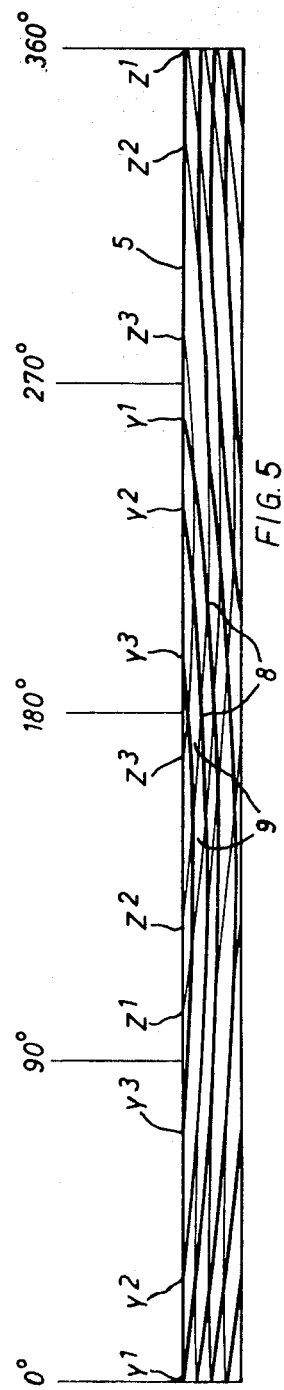

SHAFT SEALS

This invention relates to shaft seals, also known as oil seals, designed for sealing against fluid leakage along shafts, such as engine crankshafts or motor vehicle drive-transmission shafts, which are difficult to seal because of such factors as shaft deflection, torsional oscillation and eccentricity in motion.

It has long been known that the sealing of such shafts can be improved by providing at the sealed periphery some form of return feed screw, or feedback scroll, formed by a helical ridge or groove on the shaft or seal surface. By suitable selection of the direction of the helix in relation to the normal direction of rotation of the shaft, the effect of relative rotation is to feed back oil or other tending to leak past the seal.

The most convenient way of providing a feedback effect is to form the required ridge or groove on the sealing periphery of the seal so that shaft modification is not required and the seal will operate on the cylindrical surface of any shaft of the appropriate size.

In U.S. Pat. application Ser. No. 650,333 filed June 30, 1967, now Pat. No. 3,504,918, by Geoffrey W. Halliday, one of the present inventors, there is described an oil seal designed to provide for feedback of sealed fluid in either direction of relative shaft rotation.

Halliday's seal comprises a molded sealing ring of resilient material having a peripheral sealing lip with a circumferential sealing band between inner and outer frustoconical surfaces, respectively facing towards and away from sealed fluid when the seal is in use, in which there is provided, extending arcuately around part of the outer frustoconical surface, at least one vane surface member, formed by a peripheral ridge or groove, of which the ends intercept the sealing band in opposite peripheral directions and present a pair of oppositely directed vane surfaces meeting the sealing band at an angle of not more than 20° to the plane of the sealing band.

The vane surfaces are operative, for one direction and the other respectively of relative shaft rotation when the seal is in use, to sweep back to the sealing band fluid leaking past the sealing band.

The present invention is a development from Halliday's seal and provides for increased scope in the distribution and spacing of vane surfaces around the sealing band.

The invention is fully described below but basically it consists in providing the outer frustoconical surface of the seal with vane members, preferably comprising peripheral ridges or sets of stepped series of peripheral parallel ridges, which mutually intersect and have ends which intercept the sealing band in opposite circumferential directions so as to provide pairs of oppositely directed vane surfaces effective to sweep fluid back to the sealing band.

The seal thus has at least two, and preferably more, pairs of oppositely directed vane surfaces and, by appropriate relative orientation of the intersecting ridges, their distribution and spacing around the sealing band can be selected to meet requirements in designing seals.

In the preferred embodiment of the invention, each ridge is part of a circle lying in a plane transversely oblique to the plane of the sealing band. The angle of obliquity of all the ridges is preferably the same but the oblique planes of intersecting ridges have different orientations about the seal axis.

By suitable selection of the number and spacing of intersecting ridges, or sets of ridges, their angle of obliquity and their respective orientations about the seal axis, a desired number and spacing of oppositely directed pairs of vane surfaces around the sealing band can be achieved.

The invention is illustrated, by way of example, on the accompanying drawings, in which:

FIG. 1 is a diametral section through a shaft seal in accordance with the invention.

FIG. 5 is a diagram showing, as a plane development, the outer frustoconical surface and intersecting ridges of the seal of FIGS. 1 and 3.

Figure 2:
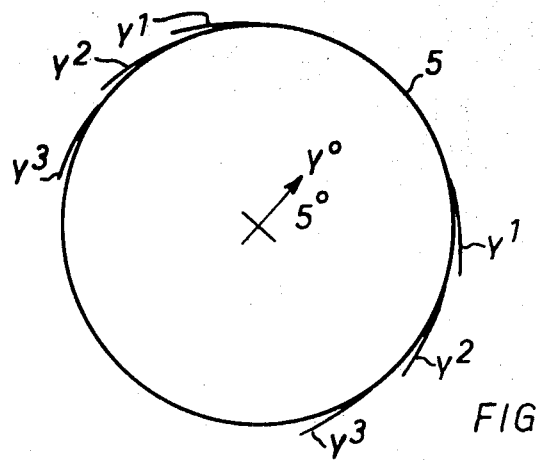
FIGS. 2, 3 and 4 are comparative diagrams each showing the circular sealing edge and vane surfaces of a seal, FIG. 2 being typical of Halliday's seal, FIG. 3 corresponding to the seal of FIG. 1 and FIG. 4 showing another example in accordance with the present invention.

The seal shown by FIG. 1, so far as its main construction is concerned, is of a well-known kind being an internal seal designed to fit fluidtight in a housing and seal, by a resilient lip, around the cylindrical surface of a shaft.

The seal consists of a molded synthetic rubber or like sealing ring of channel-section having an outer cylindrical wall 1, stiffened by an L-section insert 2 to form a holding portion to fit in a housing, and a flexible flange 3 which is embraced by a garter spring 4 and provides the sealing lip.

A circular sealing edge 5 is formed by the junction between respectively outer and inner frustoconical surfaces 6 and 7, all coaxial with the axis X—X of the seal.

In usual manufacture of the seal, the surface 6 is molded to the full axial extent of the flange 3, as indicated in broken lines, and the surface 7 is then cut, by rotation of the seal about the axis X—X against an inclined knife, to form the sealing edge 5 at the junction of the surfaces 6 and 7. In use of the seal, initial wear against the shaft surface, known as "bedding in," axially widens the edge 5 to a narrow band. The term "sealing band" is used to define the initial sealing edge or the resulting narrow band.

As so far described, the seal of FIG. 1 conforms to known practice and the embodiment of the present invention comprises the provision of two sets of intersecting ridges, Y and Z, molded on the outer frustoconical surface 6, each set consisting of a stepped series of peripheral parallel ridges.

The ridges are circular and the ridges of each set are uniformly spaced and coaxial about a respective axis slightly inclined, at 5° in the example illustrated, to the axis X—X of the seal.

The ridges thus lie in planes transversely oblique to the plane of the sealing edge, at an angle of 5°, the planes of the ridges in each set being mutually parallel but each set having a different orientation about the seal axis X—X.

In the seal as molded, the ridges continue over the full axial extent of the surface 6, but, when the surface 7 is cut, arcs of ridges are cut off at the sealing edge 5 leaving ends of the ridges intercepting the sealing edge and forming pairs of vane surfaces $Y^1$, $Y^2$ etc. and $Z^1$, $Z^2$ etc. respectively.

If only one set of ridges were provided, for instance the ridges Y, then the seal would be typical of Halliday's seal. Such a seal is illustrated diagrammatically by FIG. 2 which shows three pairs of vane surfaces $Y^1$, $Y^2$ and $Y^3$ intercepting the sealing edge 5. The oblique axis of the ridges Y is indicated as $Y°$, inclined at 5° to the seal axis, and it can be seen that the vane surfaces are grouped symmetrically about opposite semicircles of the sealing edge 5, the vane surfaces being circumferentially oppositely directed as between one group and the other.

Figure 3:
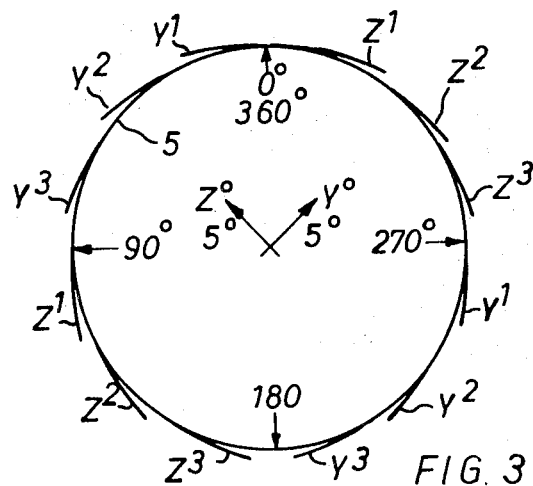

FIG. 3 diagrammatically illustrates the present invention which introduces the second set of ridges Z similar in all respects to the set of ridges Y except that their oblique axis has a different orientation about the seal axis, at 90° from the axis $Y°$ as indicated by $Z°$ in FIG. 3.

The pairs of vane surfaces $Z^1$, $Z^2$ and $Z^3$ provided by the ridges Z correspond to the pairs of vane surfaces provided by the ridges Y but are located at 90° therefrom around the sealing edge 5 which is thus provided with six pairs of vane surfaces regularly spaced around the circumference.

The pattern of the intersecting ridges Y and Z of the seal of FIGS. 1 and 3 is shown, as a plane development diagram, by FIG. 5. To assist illustration, the ridges Y are shown as thicker lines than the ridges Z in FIG. 1 and 5.

The relationship of FIGS. 1, 3 and 5 can be observed by comparison of the corresponding cardinal points indicated as 0°–360°, which are coincident, 90°, 180° and 270° respectively. The pattern of ridges as illustrated is symmetrical about the midpoint 180°.

Consideration of the geometry will show that the substantially regular spacing of the vane surfaces in such a symmetrical pattern could not be achieved with a single set of ridges coaxial about one oblique axis. Even with closer spacing of the ridges of a single set, with the object of increasing the number of pairs of vane surfaces, the spacing would appreciably increase away from the midpoint of the pattern.

As best seen in FIGS. 1 and 5, two sets of ridges, Y and Z, mutually intersect at crossover junctions 8 and form between them a pattern of substantially rhomboidal spaces 9 of progressively different size but all having major axes extending substantially circumferentially.

The seal can conveniently be produced, in the known manner mentioned above, by molding the surface 6, complete with the ridges Y and Z, up to the full axial extent of the lip 3 and then knifing the surface 7. There is no need to effect knifing to a high accuracy for location of the sealing edge 5 provided that this edge passes clearly through spaces 9 rather than through crossover junctions 8.

The preferred cross-sectional shape of the ridges Y and Z is a substantially L-section or right-angled triangular shape with one flank surface parallel to the seal axis X—X.

Instead of cutting the surface 7, it is possible to mold the surfaces 6 and 7 complete with the desired pattern of ridges but regard must be made to comparative cost of molding tools, and avoidance or removal of molding flash, for economic production.

Figure 6:
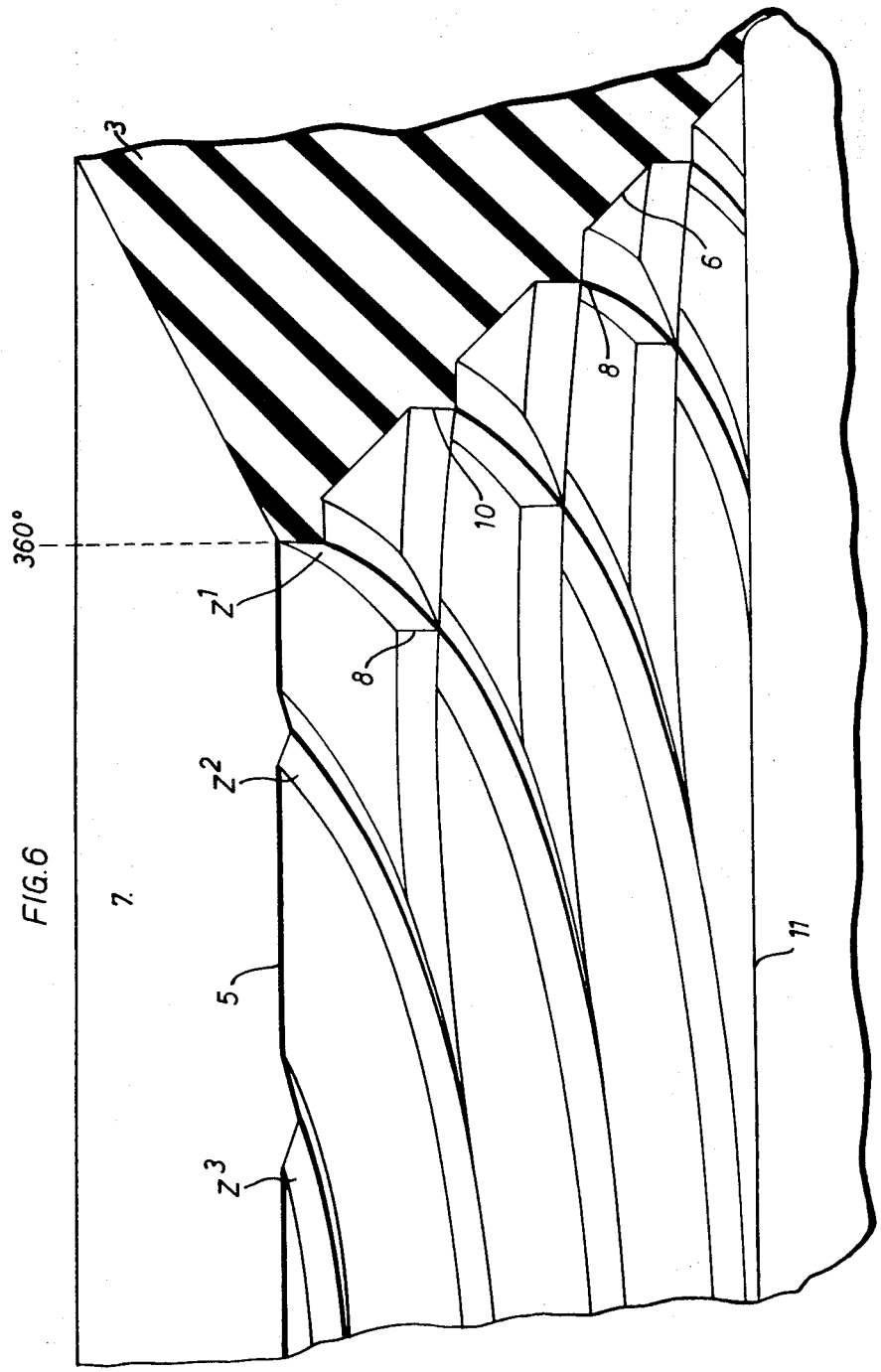
FIG. 6 is a fragmentary section showing, on a much enlarged scale, part of the right-hand side of FIG. 1.

The cross-sectional shape of the ridges is shown in FIG. 6 which is on an enlarged scale and somewhat exaggerated to show how the ridges intercept the sealing edge 5 and crossover at junctions 8.

At the midpoints of the junctions the cross-sectional shapes of the ridges coincide and the radial section of the ridges in FIG. 6 shows their cross-sectional shapes as coincident. The flank surface 10 of each ridge is parallel to the seal axis so that such flank surfaces are cylindrical about the seal axis.

It will be appreciated that, dependent on the number and spacing of the ridges and the length of the frustoconical surface 6, some molded ridges may not be intercepted by the sealing edge 5 and will remain as complete oblique rings on the surface 6.

Also, the molding of ridges furthest from the eventual sealing edge 5 will not extend beyond the outer edge 11 of the frustoconical surface 6, the edge 11 in effect cutting off intermediate arcs of such intercepted ridges.

In FIG. 6, the dimensions of the ridges are enlarged for the purposes of illustration but in practice the ridges are very fine so that they project only slightly from the surface 6 on which they are molded and merge into the sealing edge 5 without presenting any projection such as would interfere with complete line contact of the edge 5 with the surface of a shaft of appropriate diameter.

The actual dimensions of the ridges depend upon the size and type of the seal but the following example should provide adequate guidance.

| | | |
|---|---|---|
| Angle of outer frustoconical surface | | 30° |
| Shaft diameter | 3.0 inches | 76.2 mm. |
| Angle of obliquity of ridges | 5° | |
| Spacing of ridges in each set | 14 per inch | 5.5 per cm. |
| Radial dimension of each ridge | 0.005 inch | 0.127 mm. |
| Axial dimension of each ridge | 0.009 inch | 0.22 mm. |

Although in the example of a seal above described, with reference to FIGS. 1, 3, 5 and 6, two sets of ridges with a difference of 90° in orientation of their oblique axes are provided, the invention includes the simple case of only two intersecting ridges, which would provide two pairs of vane surfaces such as $Y^2$ and $Z^2$, and also includes the provision of more than two sets of ridges and any suitable difference in orientation of their oblique axes.

One alternative arrangement is diagrammatically illustrated by FIG. 4 which shows the effect of a difference of 180° in the orientation of the oblique axes Y° and Z° about the seal axis X—X, the ridges Y and Z being otherwise as described with reference to FIG. 3.

Figure 4:
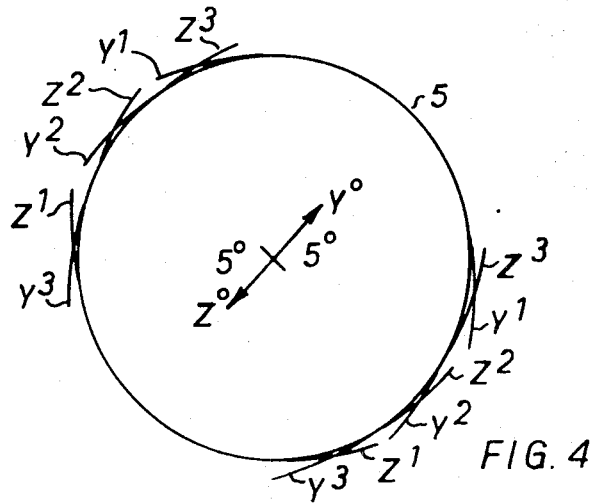

It can be seen in FIG. 4 that the vane surfaces are closely spaced in opposition and grouped at opposite sides of the sealing edge.

By selecting the number and spacing of ridges or sets of ridges and their difference in orientation, a wide variation in the distribution of vane surfaces around the sealing edge can be achieved.

The invention has been described and illustrated as applied to an internal shaft seal but it could be applied to an external seal which, as is well known, is mounted on a shaft to rotate therewith and seal against a surrounding cylindrical surface of a housing. In an external seal, the relative positions of the holding portion wall 1 and the flange 3 are inverted and the garter spring 4 acts radially outwardly.

The resilient material of the sealing ring may be synthetic rubber, as mentioned above, or natural rubber or like material such as the plastics materials known as elastomers.

We claim:

1. In a shaft seal comprising a molded sealing ring of resilient material having a peripheral sealing lip, said lip having inner and outer, mutually convergent, peripheral frustoconical surfaces, respectively facing towards and away from the fluid-sealing side of the seal, a continuous circumferential sealing band coaxial with said ring being defined on said lip by the convergence of said frustoconical surfaces, at least one first vane member extending arcuately around part of said outer frustoconical surface, said first vane member having two ends which intercept said continuous circumferential sealing band respectively in opposite circumferential directions at an angle of not more than 20° to the plane of said sealing band, said first vane member also having flank surfaces between said ends, said ends of said first vane member presenting a pair of oppositely directed flank surfaces progressively joining said sealing band, and said pair of flank surfaces being operative as vane surfaces, for one direction and the other respectively of relative shaft rotation when the seal is in use, to sweep back to the sealing band fluid leaking past said sealing band; the improvement which consists in the provision of at least one second vane member corresponding in all respects to said first vane member except that said second vane member so extends arcuately around said outer frustoconical surface that said vane members mutually intersect and said second vane member presents a second pair of oppositely directed flank surfaces progressively joining said sealing band and operative as vane surfaces in like manner as said vane surfaces of said first vane member.

2. A shaft seal according to claim 1, in which said outer frustoconical surface has molded therein at least two mutually intersecting sets of peripheral ridges, the ridges of a first one of said sets comprising and corresponding to said first vane member and the ridges of a second one of said sets comprising and corresponding to said second vane member.

3. A shaft seal according to claim 2, in which each said set of ridges consists of a stepped series of peripheral parallel ridges, each ridge lies in a plane oblique to the plane of said sealing band and the obliquity of the planes of the ridges of each said set has a different orientation about the axis of the sealing ring as between one set and another.

4. A shaft seal according to claim 3, in which the ridges of each said set are circular and coaxial about an axis oblique to the axis of the sealing ring.

5. A shaft seal according to claim 4, in which said ridges are each substantially of L-section, with one flank surface substantially cylindrical about the axis of the sealing ring, and the cross sections of said ridges are coincident at the midpoints of the intersection of mutually intersecting ridges.

* * * * *